(12) United States Patent
Halverson et al.

(10) Patent No.: US 9,329,972 B2
(45) Date of Patent: May 3, 2016

(54) IMPLEMENTING CLIENT BASED THROTTLED ERROR LOGGING IN A COMPUTING DEVICE

(71) Applicant: LENOVO ENTERPRISE SOLUTIONS (SINGAPORE) PTE. LTD., Singapore (SG)

(72) Inventors: Paul S. Halverson, Byron, MN (US); Gary R. Ricard, Chatfield, MN (US)

(73) Assignee: Lenovo Enterprise Solutions (Singapore) Pte. Ltd., Singapore (SG)

( * ) Notice: Subject to any disclaimer, the term of this patent is extended or adjusted under 35 U.S.C. 154(b) by 262 days.

(21) Appl. No.: 13/781,305

(22) Filed: Feb. 28, 2013

(65) Prior Publication Data

US 2014/0245082 A1  Aug. 28, 2014

(51) Int. Cl.
  G06F 11/30 (2006.01)
  G06F 11/34 (2006.01)
  G06F 21/55 (2013.01)
  G06F 11/07 (2006.01)

(52) U.S. Cl.
  CPC ........ G06F 11/3476 (2013.01); G06F 11/0706 (2013.01); G06F 11/0781 (2013.01); G06F 11/3072 (2013.01); G06F 21/55 (2013.01); G06F 11/3082 (2013.01); G06F 2201/81 (2013.01); G06F 2201/88 (2013.01)

(58) Field of Classification Search
  CPC ............ G06F 11/3476; G06F 11/3466; G06F 11/3495; G06F 11/3072; G06F 11/3086; G06F 11/3065; G06F 11/0769; G06F 11/3082; G06F 2201/86; H04L 41/0604; H04L 41/0622; H04L 41/069
  See application file for complete search history.

(56) References Cited

U.S. PATENT DOCUMENTS

| | | | |
|---|---|---|---|
| 7,779,015 B2 * | 8/2010 | Abbott | G06F 1/163 702/127 |
| 2003/0191716 A1 * | 10/2003 | Woods et al. | 705/50 |
| 2004/0042470 A1 * | 3/2004 | Cooper et al. | 370/401 |
| 2004/0254949 A1 * | 12/2004 | Amirthalingam | G05B 23/0264 |
| 2005/0114508 A1 * | 5/2005 | DeStefano | 709/224 |
| 2006/0075308 A1 * | 4/2006 | Haselden et al. | 714/39 |
| 2007/0156786 A1 * | 7/2007 | May | G06F 11/3476 |
| 2007/0283194 A1 * | 12/2007 | Villella et al. | 714/57 |
| 2009/0012748 A1 * | 1/2009 | Beish et al. | 702/187 |
| 2010/0115443 A1 * | 5/2010 | Richstein | 715/771 |
| 2011/0314148 A1 * | 12/2011 | Petersen et al. | 709/224 |
| 2012/0005542 A1 * | 1/2012 | Petersen et al. | 714/48 |
| 2012/0246303 A1 | 9/2012 | Petersen et al. | |
| 2014/0032694 A1 * | 1/2014 | Cohn et al. | 709/207 |

OTHER PUBLICATIONS

Wikipedia's Object-oriented programming historical version from Feb. 25, 2013 https://en.wikipedia.org/w/index.php?title=Object-oriented_programming&oldid=540285134.*

* cited by examiner

*Primary Examiner* — Joseph Schell
(74) *Attorney, Agent, or Firm* — Edward J. Lenart; Katherine S. Brown; Kennedy Lenart Spraggins LLP

(57) ABSTRACT

A method, system and computer program product are provided for implementing client based throttled error logging in a computer system. A log governor, controlled by a client of a log manager, prevents the flooding of the logs, identifies how many repetitive logs have been suppressed, and is tailored such that log suppression requirements are enabled to be specified for each individual log. A space required for the log governor features or log governing information is allocated in the client.

10 Claims, 5 Drawing Sheets

__US 9,329,972 B2__

IMPLEMENTING CLIENT BASED THROTTLED ERROR LOGGING IN A COMPUTING DEVICE

FIELD OF THE INVENTION

The present invention relates generally to the data processing field, and more particularly, relates to a method, system and computer program product for implementing client based throttled error logging in a computer system.

DESCRIPTION OF THE RELATED ART

In almost every operating system error logs of some sort exist as a mechanism for activity tracking and debugging. Logging software has one fundamental drawback on almost every system in that it is limited by the availability of storage to house the logs.

Most computer systems provide a fixed amount of log space that wraps back to the beginning when all space is consumed, overlaying the oldest logs. This is a weakness where a repetitive log can overlay older pertinent debug information and executing code that causes rapid log deposits can actually be used as a denial-of-service attack with the added detriment of potentially overlaying logs that might be used to identify the attacker.

Attempts to solve these issues in the past have required logging managers to keep frequency information on a plethora of potential logs to recognize the rate at which they are occurring. This statistic tracking consumes more space and puts a huge requirement on the log manager to know the details of every log it could potentially process.

A need exists for an effective mechanism to enable client based throttled error logging in a computer system.

SUMMARY OF THE INVENTION

Principal aspects of the present invention are to provide a method, system and computer program product for implementing client based throttled error logging in a computer system. Other important aspects of the present invention are to provide such method, system and computer program product substantially without negative effects and that overcome many of the disadvantages of prior art arrangements.

In brief, a method, system and computer program product are provided for implementing client based throttled error logging in a computer system. A log governor, controlled by a client of a log manager, prevents the flooding of the logs, identifies how many repetitive logs have been suppressed, and is tailored such that log suppression requirements are enabled to be specified for each individual log. A space required for the log governor features or log governing information is allocated in the client.

In accordance with features of the invention, the log governor encloses a call to the log manager for depositing a particular log. One instantiation of the log governor class is required for each log to be governed.

In accordance with features of the invention, a count of log occurrences per unit time is kept for every log the client chooses to throttle and these parameters are chosen by the client when the log governor class is constructed.

In accordance with features of the invention, the log governor class tracks log frequency, or another selected pertinent statistic/heuristic log storage allocated by the client for logs the client chooses. Thus the client selects which logs are throttled and what the log throttling criteria are.

In accordance with features of the invention, when a log timing threshold is reached the log governor deposits a summary log indicating the pertinent log information and the number of suppressed logs and the client has control over their activity tracking and debug information.

BRIEF DESCRIPTION OF THE DRAWINGS

The present invention together with the above and other objects and advantages may best be understood from the following detailed description of the preferred embodiments of the invention illustrated in the drawings, wherein.

DETAILED DESCRIPTION OF THE PREFERRED EMBODIMENTS

In the following detailed description of embodiments of the invention, reference is made to the accompanying drawings, which illustrate example embodiments by which the invention may be practiced. It is to be understood that other embodiments may be utilized and structural changes may be made without departing from the scope of the invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

In accordance with features of the invention, a method, system and computer program product are provided for implementing client based throttled error logging in a computer system.

In accordance with features of the invention, the method, system and computer program product provide a static wrapper class or Log Governor that encloses the call to a log manager for depositing a particular log. One instantiation of the Log Governor class is required for each log to be governed. At minimum a count of log occurrences per unit time is kept for every log the client chooses to throttle and these parameters are chosen by the client when the Log Governor class is constructed. The Log Governor class tracks log frequency, or another pertinent selected statistic/heuristic log governing information in storage allocated by the client for any logs the client chooses. Thus the client can select which logs are throttled and what the log throttling criteria are, and the client, not the log manager, provides storage allocated for log throttling management data for the logs that are subject to the issue. When a log timing threshold is reached the Log Governor deposits a summary log indicating the pertinent log information and the number of suppressed logs. Thus the log manager is relieved of all knowledge pertaining to specific client logs and the client has much greater control over activity tracking and debug information.

Figure 1:
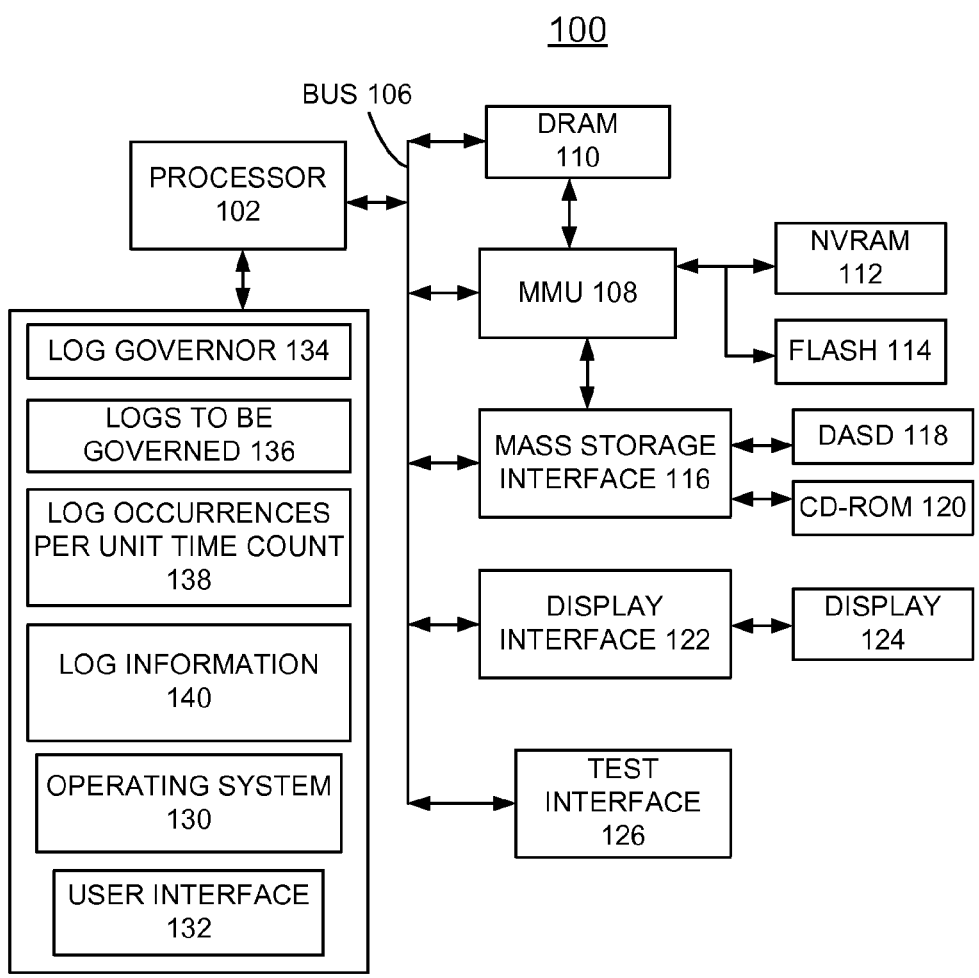
FIGS. 1 and 2 illustrates an example computer system including a static wrapper class Log Governor for implementing client based throttled error logging in accordance with the preferred embodiment.

Having reference now to the drawings, in FIG. 1, there is shown an example computer system generally designated by the reference character 100 for implementing client based throttled error logging in accordance with the preferred embodiment.

Computer system 100 includes one or more processors 102 or programmable central processing units (CPUs) 102 coupled by a system bus 106 to a memory management unit (MMU) 108 and system memory including a dynamic random access memory (DRAM) 110, a nonvolatile random access memory (NVRAM) 112, and a flash memory 114. The system bus 106 may be private or public, and it should be understood that the present invention is not limited to a particular bus topology used. A mass storage interface 116 coupled to the system bus 106 and MMU 108 connects a direct access storage device (DASD) 118 and a CD-ROM drive 120 to the main processor 102. Computer system 100 includes a display interface 122 connected to a display 124, and a test interface 126 coupled to the system bus 106.

Computer system 100 includes an operating system 130, a user interface 132 and a log governor 134 in accordance with the preferred embodiments. A client is enabled by log governor 134 to control a number of logs 136 to be governed, a count 138 of log occurrences per unit time count 138, and selected log information 140 in accordance with the preferred embodiments.

Computer system 100 is shown in simplified form sufficient for understanding the present invention. The illustrated computer system 100 is not intended to imply architectural or functional limitations. The present invention can be used with various hardware implementations and systems and various other internal hardware devices, for example, multiple main processors.

Figure 2:
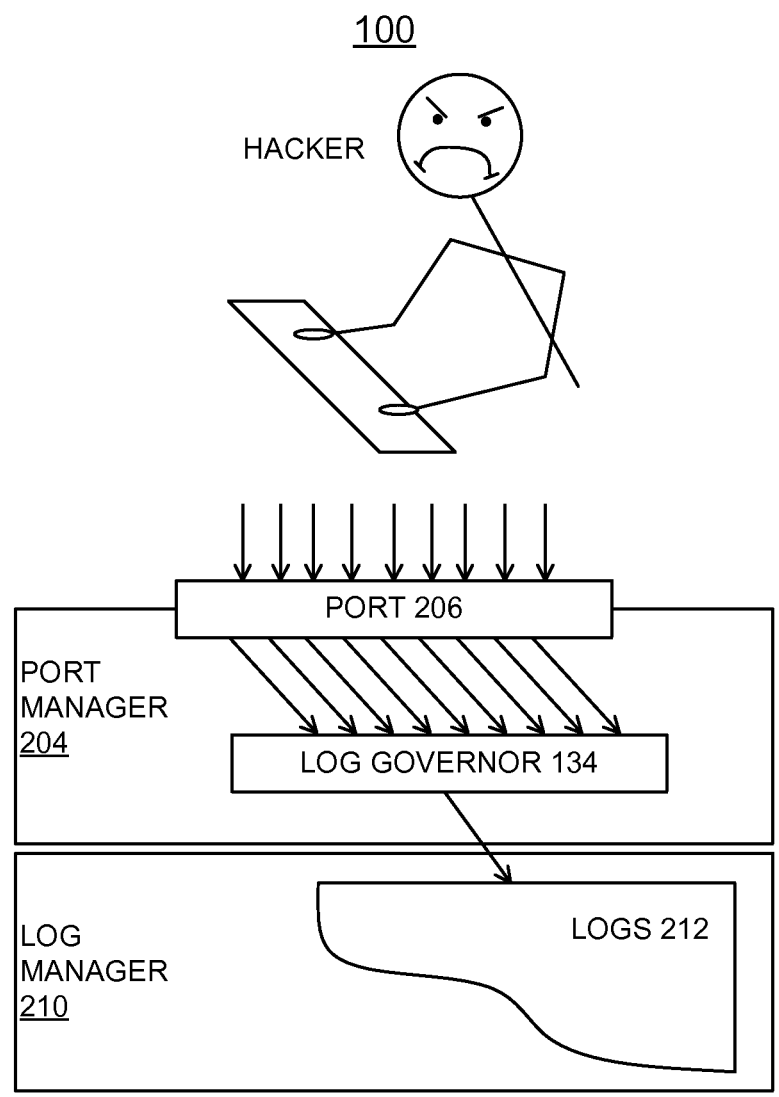

In FIG. 2, computer system 100 includes a port manager 204 receiving calls from a port 206. The port manager 204 includes the log governor 134 coupled to a log manager 210. The log governor 134 encloses the call to the log manager 210 for depositing a particular log 212 in logs of the log manager. The log governor 134 of the invention avoids hacker attacks of the prior art computer system with a conventional log manager as shown in FIG. 3.

In accordance with features of the invention, the log governor 134 prevents the flooding of the log. The client controls the log governor 134 which advantageously is tailored such that log suppression requirements can be specified for each individual log. The client selects which logs are throttled and what the log throttling criteria are, and the client provides storage allocated for the log throttling management data for these logs.

Figure 3:
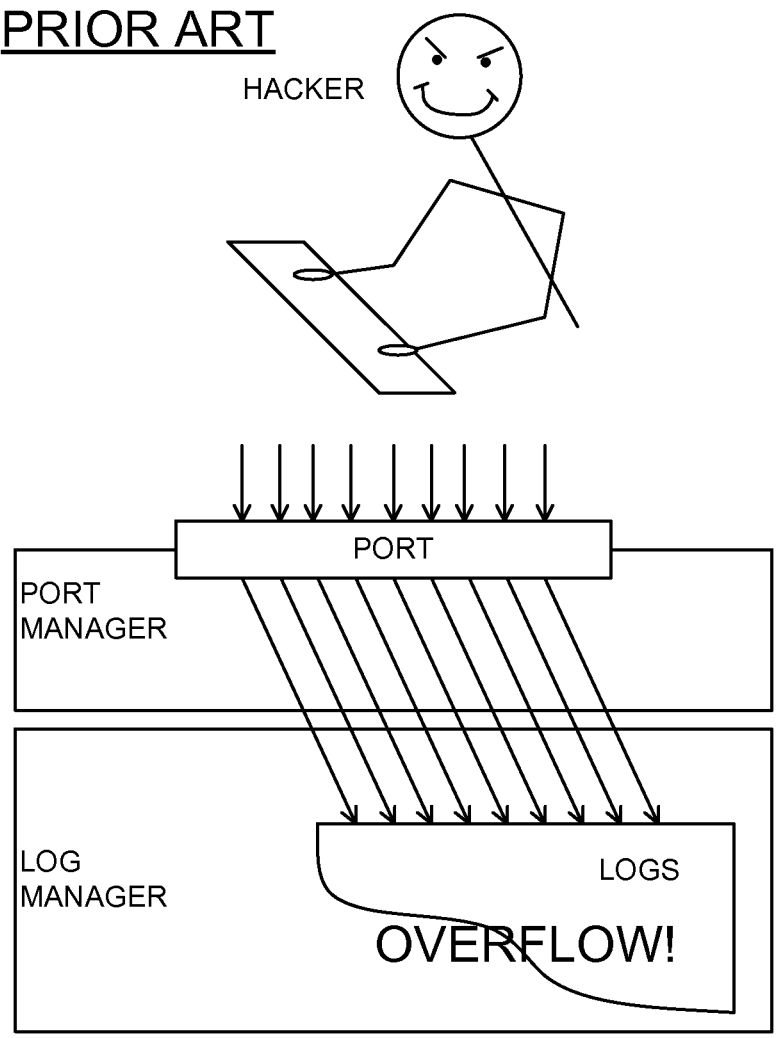
FIG. 3 illustrates a prior art computer system including a log manager.

FIG. 3 illustrates a prior art computer system including a conventional log manager provided with a port manager with a hacker effectively being allowed to cause a repetitive log that can overlay older pertinent debug information and executing code that causes rapid log deposits that can be used as a denial-of-service attack with the added detriment of potentially overlaying logs that might be used to identify the attacker.

Figure 4:
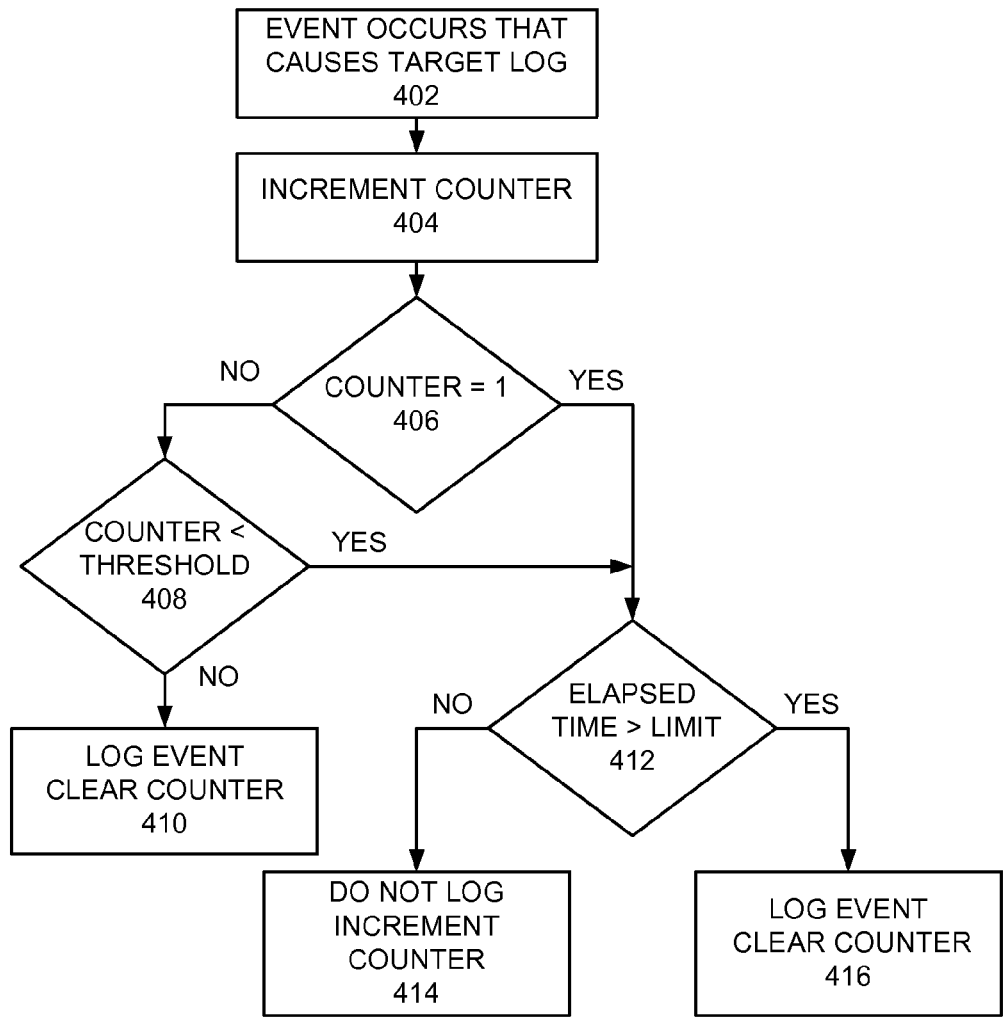
FIG. 4 is a flow chart illustrating exemplary operations for implementing client based throttled error logging in accordance with the preferred embodiment.

Referring to FIG. 4, there are shown exemplary operations for implementing client based throttled error logging generally designated by the reference character 400 in accordance with the preferred embodiment.

As indicated in a block 402, an event occurs that causes a target log. A counter is incremented as indicated in a block 404. Checking the counter equal to one is performed as indicated in a decision block 406. When the counter does not equal one, checking if the counter is less than a threshold value as indicated in a decision block 408. When the counter is greater than the threshold value, then the event is logged and the counter cleared as indicated in a block 410.

When the counter equals one at decision block 406, or when the counter is less than a threshold value at decision block 408, then checking if the elapsed time is greater than a timing limit is performed as indicated in a decision block 412. When the elapsed time is less than the timing limit, then the event is not logged and the counter incremented as indicated in a block 414. When the elapsed time is greater than the timing limit, then the event is logged and the counter cleared as indicated in a block 416.

It should be understood that the log governor 134 is not limited to the illustrated operations of FIG. 4, various pertinent statistic/heuristics can be selected by the client and monitored.

Sample code for implementing client based throttled error logging in accordance with the preferred embodiment is provided as follows:

```
This is the implementation of the static wrapper class:
import java.util.concurrent.atomic.AtomicLong;
import java.util.logging.Level;
import java.util.logging.Logger;
import com.ibm.itme.rpz.server.plugin.Activator;
/*
 * public class LogGovernor
 *
 * A wrapper of the Logger class that only creates a log entry if the
 * time limit or the threshold has been exceeded.
 *
 */
public class LogGovernor {
    static final String COPYRIGHT =
com.ibm.itme.utils.common.Copyright.HEADER + "2012"
        + com.ibm.itme.utils.common.Copyright.FOOTER;
    // The static logger that is being wrapped
    private static Logger logger = Activator.getLogger( );
    // The number of logging invocations that have occurred since mStartTime
    private AtomicLong mNumExceptions = new AtomicLong(0);
    // The time this logging session started or restarted due to mTimeLimit expiring
    private AtomicLong mStartTime = new AtomicLong(0);
    // The time limit
    private long mTimeLimit;
    // The threshold
    private long mLogThreshold;
```

```
/*
 * constructor
 *
 * Parameters:
 *   iTimeLimit - the time in nanoseconds to wait
 *   iLogThreshold - the number of logging invocations to ignore
 *
 *   A summary log will be written and the time limit and threshold
 *   will be reset whenever either is exceeded.
 */
public LogGovernor(long iTimeLimit, long iLogThreshold) {
    mTimeLimit = iTimeLimit;
    mLogThreshold = iLogThreshold;
    mStartTime.set(System.nanoTime( ));
}
/*
 * log
 *
 * The logic that wraps the log entry. It will only create a log entry
 * if the time limit or the threshold has been exceeded.
 * A summary log will be written and the time limit and threshold
 * will be reset whenever either is exceeded.
 *
 * Parameters:
 *   iLevel - the log level for this log entry
 *   iMessage - the message to include in the log
 *   iExcept - the associated exception (if any)
 */
public void log(Level iLevel, String iMessage, Exception iExcept) {
    // Prevent log overflow attack
    long mNow = System.nanoTime( );
    mNumExceptions.getAndIncrement( );
    if (mNumExceptions.get( ) == 1) {
        if ((mNow - mStartTime.get( )) >= mTimeLimit) {
            // Make sure to log the first instance
            logger.log(iLevel, mNumExceptions.get( ) + iMessage + iExcept, iExcept);
            mNumExceptions. set(0);
            mStartTime. set(mNow);
        }
    } else if ((mNumExceptions.get( ) < mLogThreshold)) {
        if ((mNow - mStartTime.get( )) >= mTimeLimit) {
            // Log if time limit has expired
            logger.log(iLevel, mNumExceptions.get( ) + iMessage + iExcept, iExcept);
            mNumExceptions.set(0);
            mStartTime.set(mNow);
        } else {
            // Don't log this instance
        }
    } else if ((mNumExceptions.get( ) >= mLogThreshold)) {
        // Log if threshold has been exceeded
        logger.log(iLevel, mNumExceptions.get( ) + iMessage + iExcept, iExcept);
        mNumExceptions.set(0);
        mStartTime.set(mNow);
    } else {
        // All other options have been exhausted...
    }
}
}
This is an implementation of an invocation of the wrapper:
The declaration:
public class TunnelServer {
    static final String COPYRIGHT =
com.ibm.itme.utils.common.Copyright.HEADER + "2011, 2012"
        + com.ibm.itme.utils.common.Copyright.FOOTER;
    private static final int TUNNEL_PORT = 3888;
    private static final long EXCEPT_TIME_LIMIT = 5 * 60L * 1000L * 1000L *
1000L; // 5 minutes in nanoseconds
    private static final long EXCEPT_THRESHOLD = 5000L;
    private static LogGovernor throttledLog = new LogGovernor(EXCEPT_TIME_LIMIT,
EXCEPT_THRESHOLD);
The invocation:
    private static void processAccept(Socket s) {
        TunnelPair tp = new TunnelPair( );
        try {
            tp.initialize(s);
            map.add(tp);
        } catch (SSLException ex) {
            throttledLog.log(Level.SEVERE, " exceptions initializing TunnelPair : ", ex);
            tp.shutdown( ); // make sure we cleanup if bad things happen.
```

```
} catch (Exception e) {
    logger.log(Level.SEVERE, "Exception initializing TunnelPair : "+ e, e);
    tp.shutdown( ); // make sure we cleanup if bad things happen.
  }
}
```

This particular wrapper class is obviously only concerned with log frequency but another selected heuristic/statistic could be used. The usage above advantageously is incorporated into a finite state machine (FSM) to prevent a repetitive invalid port connection log from flooding the log manager and preventing useful work except logging from occurring. This object oriented pattern advantageously can be for incorporation into various log managers for client usage.

Figure 5:
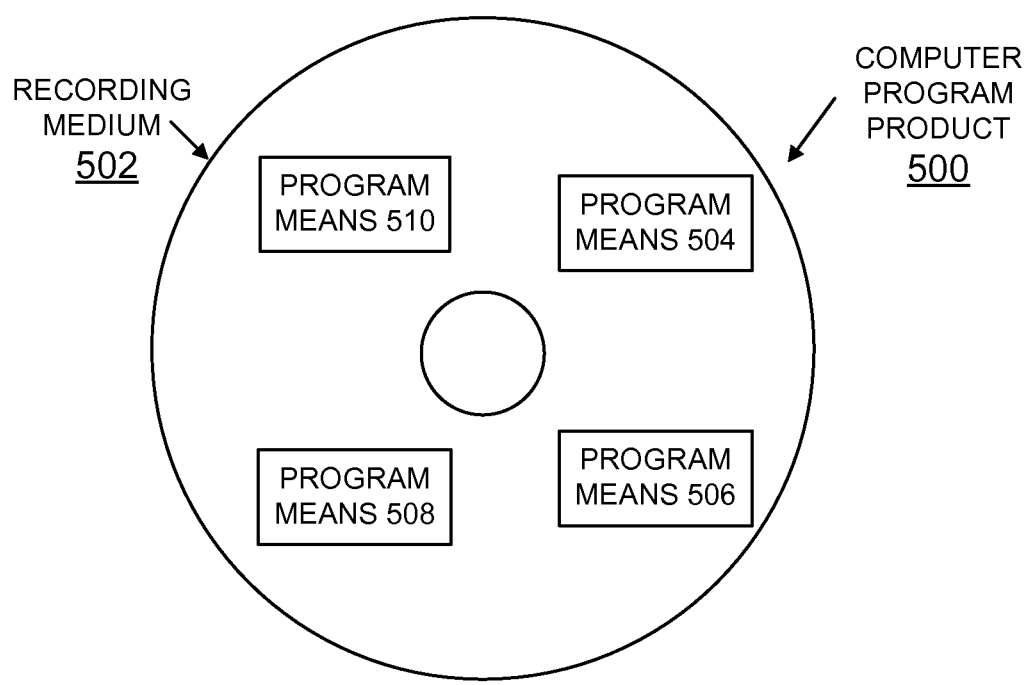
FIG. 5 is a block diagram illustrating a computer program product in accordance with the preferred embodiment.

Referring now to FIG. 5, an article of manufacture or a computer program product 500 of the invention is illustrated. The computer program product 500 is tangibly embodied on a non-transitory computer readable storage medium that includes a recording medium 502, such as, a floppy disk, a high capacity read only memory in the form of an optically read compact disk or CD-ROM, a tape, or another similar computer program product. Recording medium 502 stores program means 504, 506, 508, and 510 on the medium 502 for carrying out the methods for implementing client based throttled error logging of the preferred embodiment in the system 100 of FIG. 1.

A sequence of program instructions or a logical assembly of one or more interrelated modules defined by the recorded program means 504, 506, 508, and 510, direct the computer system 100 for implementing client based throttled error logging of the preferred embodiment.

While the present invention has been described with reference to the details of the embodiments of the invention shown in the drawing, these details are not intended to limit the scope of the invention as claimed in the appended claims.

What is claimed is:

1. A method comprising:
  by first program instructions on a computing device,
    communicating one or more enclosed calls for depositing an individual log into one or more logs to prevent flooding the one or more logs;
    accessing one or more log suppression specifications specified by a client for each individual log;
    communicating pertinent log information corresponding to each individual log to a storage space allocated by the client;
    identifying a number of repetitive logs having been suppressed and
    enabling client controlled log activity tracking and debug information by using the log suppression specifications specified by the client for each individual including
    constructing a log class with a time limit and one or more log threshold parameters, wherein the client selects the time limit and the one or more log threshold parameters when the log class is constructed.

2. The method as recited in claim 1 includes providing one instantiation of a log class for each individual log.

3. The method as recited in claim 1 wherein identifying a number of repetitive logs having been suppressed includes maintaining a count of log occurrences per unit time for each said individual log.

4. The method as recited in claim 1 includes depositing a summary log indicating the pertinent log information and the number of suppressed logs when a log timing threshold value is reached.

5. The method as recited in claim 1 includes depositing a summary log indicating the pertinent log information and the number of suppressed logs when a log threshold value is reached.

6. An apparatus comprising:
  a processor,
  a log governor, controlled by a client of the log manager, the log governor for enclosing one or more calls to the log manager for depositing an individual log into one or more logs to prevent flooding of the one or more logs,
  the processor using the log governor to perform the steps of:
    enabling log suppression specifications for each individual log,
    allocating a client storage space for pertinent log information corresponding to each individual log, and
    identifying a number of repetitive logs having been suppressed; and
    enabling client controlled log activity tracking and debug information by using parameter values selected by the client and set when constructing the log governor including
    constructing a log class with a time limit and one or more log threshold parameters, wherein the client selects the time limit and the one or more log threshold parameters when the log class is constructed.

7. The apparatus as recited in claim 6 includes one instantiation of the log governor being provided for each individual log.

8. The apparatus as recited in claim 6 wherein identifying a number of repetitive logs having been suppressed includes maintaining a count of log occurrences per unit time for each individual log.

9. The apparatus as recited in claim 6 includes the log governor depositing a summary log indicating the pertinent log information and the number of suppressed logs when a log timing threshold value is reached.

10. The apparatus as recited in claim 6 includes the log governor depositing a summary log indicating the pertinent log information and the number of suppressed logs when a log threshold value is reached.

\* \* \* \* \*